US011148394B2

(12) United States Patent
Moon

(10) Patent No.: US 11,148,394 B2
(45) Date of Patent: Oct. 19, 2021

(54) GRAPHENE HEATING DEVICE

(71) Applicant: LG ELECTRONICS INC., Seoul (KR)

(72) Inventor: Jinsan Moon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 366 days.

(21) Appl. No.: 16/329,188

(22) PCT Filed: Nov. 24, 2016

(86) PCT No.: PCT/KR2016/013657
§ 371 (c)(1),
(2) Date: Feb. 27, 2019

(87) PCT Pub. No.: WO2018/043827
PCT Pub. Date: Mar. 8, 2018

(65) Prior Publication Data
US 2019/0184940 A1 Jun. 20, 2019

(30) Foreign Application Priority Data
Sep. 1, 2016 (KR) .......................... 10-2016-0112775

(51) Int. Cl.
*B32B 7/12* (2006.01)
*B32B 9/00* (2006.01)
(Continued)

(52) U.S. Cl.
CPC ............ *B32B 9/007* (2013.01); *B32B 7/12* (2013.01); *B32B 17/06* (2013.01); *B60Q 1/0017* (2013.01);
(Continued)

(58) Field of Classification Search
CPC . B32B 7/12; B32B 9/007; B32B 17/06; F21S 45/60; H05B 3/145
See application file for complete search history.

(56) References Cited

U.S. PATENT DOCUMENTS

2012/0208008 A1 8/2012 Tour et al.

FOREIGN PATENT DOCUMENTS

CN 102804912 11/2012
CN 103692743 4/2014
(Continued)

OTHER PUBLICATIONS

PCT International Application No. PCT/KR2016/013657, International Search Report dated May 23, 2017, 6 pages.
(Continued)

*Primary Examiner* — Elizabeth E Mulvaney
(74) *Attorney, Agent, or Firm* — Lee, Hong, Degerman, Kang & Waimey

(57) ABSTRACT

The present invention relates to a transparent heating device using graphene. To accomplish the aforementioned purpose, the present invention provides a graphene heating device comprising: a transparent substrate; an adhesive layer formed on the transparent substrate; and a graphene layer formed on the adhesive layer, where the graphene layer is heated by a current flowing along the graphene layer. According to one embodiment of the present invention, fogging or icing occurs on the surface of an object that can be removed without deteriorating the light transmittance of the object, which requires the light transmittance.

10 Claims, 5 Drawing Sheets

(51) Int. Cl.
    *H05B 3/16*     (2006.01)
    *H05B 3/84*     (2006.01)
    *F21S 45/60*     (2018.01)
    *B32B 17/06*     (2006.01)
    *B60Q 1/00*     (2006.01)
    *B60S 1/02*     (2006.01)
    *H05B 1/02*     (2006.01)
    *H05B 3/14*     (2006.01)

(52) U.S. Cl.
CPC ............... *B60S 1/026* (2013.01); *F21S 45/60* (2018.01); *H05B 1/0236* (2013.01); *H05B 3/145* (2013.01); *H05B 3/16* (2013.01); *H05B 3/84* (2013.01); *B32B 2255/00* (2013.01); *B32B 2307/202* (2013.01); *B32B 2307/726* (2013.01); *B32B 2307/728* (2013.01); *B32B 2307/73* (2013.01); *B32B 2457/00* (2013.01); *B32B 2605/00* (2013.01)

(56) References Cited

FOREIGN PATENT DOCUMENTS

| | | | |
|---|---|---|---|
| DE | 10346270 | 7/2004 | |
| EP | 1718127 | 11/2006 | |
| KR | 101024622 | 3/2011 | |
| KR | 101147252 | 5/2012 | |
| KR | 1020120099331 | 9/2012 | |
| WO | WO-2012045781 A1 * | 4/2012 | ............ H05B 3/145 |
| WO | 2016070068 | 5/2016 | |

OTHER PUBLICATIONS

The State Intellectual Property Office of the Peoples Republic of China Application Serial No. 201680088822.7, Office Action dated Oct. 27, 2020, 12 pages.

European Patent Office Application Serial No. 16915307.9, Search Report dated Feb. 19, 2020, 8 pages.

\* cited by examiner

GRAPHENE HEATING DEVICE

CROSS-REFERENCE TO RELATED APPLICATIONS

This application is the National Stage filing under 35 U.S.C. 371 of International Application No. PCT/KR2016/013657, filed on Nov. 24, 2016, which claims the benefit of earlier filing date and right of priority to Korean Application No. 10-2016-0112775, filed on Sep. 1, 2016, the contents of which are all hereby incorporated by reference herein in their entirety.

TECHNICAL FIELD

The present invention relates to a transparent heating device using graphene.

BACKGROUND ART

When air hits a surface of an object with a temperature lower than a dew point, water vapor is condensed on the surface of the object. In case where the surface of the object on which the water vapor is condensed is made of a light-transmitting material, light transmittance of the object is lowered due to water droplets condensed on the surface.

For example, when water vapor is condensed on a surface of a window, a camera lens, a vehicle lamp, etc., it makes it difficult to perform an original function of the object.

As a method for eliminating a fogging problem on a surface, wiping a surface of an object is a temporary method, and this method has a disadvantage in that the surface has to be wiped every time water droplets are formed on the surface. In addition, in case where such fogging occurs at a position such as an inside of a vehicle lamp, which is hardly wiped, it is difficult to eliminate the fogging problem.

On the other hand, in the related art, in order to prevent fogging on a surface of an object which requires light transmittance, a hydrophilic or hydrophobic coating layer is coated on the surface of the object to remove water droplets that are formed on the surface of the object. However, the above-described method cannot completely remove water droplets that are formed on the surface at predetermined humidity or higher.

Accordingly, there is an increasing demand for a device which is capable of effectively removing water droplets formed on a surface of an object requiring for light transmittance.

DISCLOSURE OF THE INVENTION

The present invention is directed to solving the aforementioned problems and other drawbacks. Another aspect of the present invention is to use a transparent heating element for removing water droplets formed on a surface thereon or a surface of an object on which the heating element is attached.

To achieve the aspects and other advantages of the present invention, there is provided a graphene heating device, including a transparent substrate, an adhesive layer formed on the transparent substrate, and a graphene layer formed on the adhesive layer, wherein the graphene layer is heated by a current flowing along the graphene layer when a predetermined voltage is applied.

In one embodiment, the device may further include a power supply unit to apply a voltage to the graphene layer.

In one embodiment, the adhesive layer may include a moisture absorbent for absorbing moisture. Accordingly, the present invention can prevent fogging on a surface by a predetermined level, even without heating a graphene layer.

In one embodiment, the device may further include a coating layer disposed beneath the transparent substrate and having hydrophilicity or hydrophobicity, and a humidity sensor to sense humidity. The power supply unit may apply a voltage to the graphene layer when the humidity sensed by the humidity sensor is equal to or higher than a reference humidity. Thus, the present invention can selectively heat the graphene layer, thereby preventing unnecessary power consumption.

In one embodiment, the device may further include a temperature sensor to sense a temperature. The power supply unit may apply a voltage to the graphene layer when the temperature sensed by the temperature sensor is equal to or lower than a reference temperature. Thus, the present invention can selectively heat the graphene layer, thereby preventing unnecessary power consumption.

In one embodiment, the graphene heating device may be disposed inside a vehicle lamp.

EFFECTS OF THE DISCLOSURE

According to an embodiment of the present invention, fogging or icing occurring on a surface of an object, which requires light transmittance, can be eliminated without deteriorating the light transmittance of the object.

In addition, according to an embodiment of the present invention, water droplets formed on a surface of an object or icing on the surface can be removed by selectively generating heat only when ambient humidity is equal to or higher than a reference humidity or the icing occurs on the surface of the object.

BEST MODE FOR CARRYING OUT THE PREFERRED EMBODIMENTS

Figure 1:
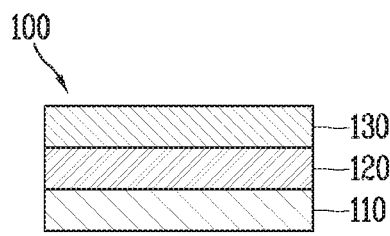
FIGS. 1 and 2 are sectional views of a graphene heating device in accordance with one embodiment of the present invention.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of features, numbers, steps, operations, components, functions or combination thereof, and it is also understood that greater or fewer features, numbers, steps, operations, components, functions or combination thereof may likewise be utilized.

A graphene heating device according to the present invention prevents deterioration of transparency of an object, which requires transparency, due to water droplets being formed or icing occurring on a surface of the object.

At this time, the graphene heating device according to the present invention may act as a transparent body. For example, the graphene heating device of the present invention may be used in place of window glass.

Meanwhile, the graphene heating device of the present invention may be used by being coupled to an object requiring for transparency. For example, the graphene heating device of the present invention may be coupled to inside of an object for use, in order to remove water droplets formed inside a vehicle lamp, inside a refrigerator having an outer wall made of a light-transmitting material, on a surface of a camera lens, and the like.

To this end, a graphene heating device 100 according to the present invention includes a transparent substrate 110, an adhesive layer 120, and a graphene layer 130. Hereinafter, the graphene heating device according to the present invention will be described with reference to the accompanying drawings.

Figure 2:
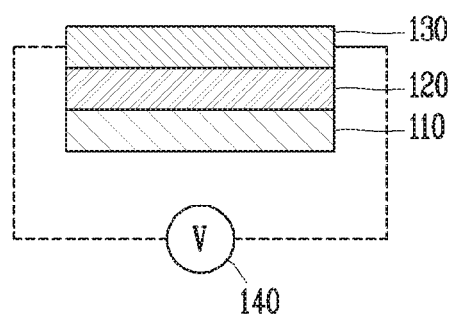

FIGS. 1 and 2 are sectional views of a graphene heating device in accordance with an embodiment of the present invention.

A transparent substrate 110 is made of glass or a light-transmitting film and serves to support a graphene thin film. The transparent substrate may be made of any material having a predetermined level of transparency.

Meanwhile, the transparent substrate 110 may be made of a flexible material, and accordingly, the graphene heating device according to the present invention may be at least partially curved. Accordingly, the graphene heating device 100 according to the present invention can be used as an outer wall of an object formed in a curved shape, and can be attached on the surface of the curved object to prevent water droplets from being formed on the surface of the object.

An adhesive layer 120 is disposed on the transparent substrate 110. The adhesive layer 120 adheres a graphene layer 130 onto the transparent substrate 110. The adhesive layer 120 is made of a material having high light transmittance so as not to affect transparency of the graphene heating device.

The graphene layer 130 is a thin film and has electrical conductivity. When a voltage is applied to the graphene layer 130, a current flows along the graphene layer 130 and heat is generated accordingly.

On the other hand, the graphene heating device according to the present invention may further include a protective layer formed to cover the graphene layer 130, though not shown. The protective layer may be made of a material having high light transmittance.

Specifically, since the graphene layer 130 is weak in hardness, it may be damaged when mechanical friction is repeatedly caused. The protective layer may be formed to cover the graphene layer 130 to protect the graphene layer 130 from the mechanical friction.

On the other hand, various types of dopants may be doped to reduce sheet resistance of the graphene layer 130. Specifically, the dopants may include a metal-based dopant and an organic dopant.

In this case, the protective layer may be made to prevent oxidation or reduction of the dopants doped on the graphene layer.

Meanwhile, the graphene heating device 100 according to the present invention may further include a power supply unit 140 configured to apply a voltage to the graphene layer.

The power supply unit 140 is not necessarily made of a light-transmitting material and may be disposed at an edge of the heating device to avoid deterioration of the transparency of the graphene heating device 100.

Meanwhile, a voltage applied to the graphene layer 130 from the power supply unit 140 may be variable. The power supply unit 140 may control an amount of heat generated by the graphene layer 130 in a manner of applying different voltages to the graphene layer 130 according to circumstances.

The graphene heating device 100 described above can remove water droplets, which are formed on a surface of the heating device or a surface of an object to which the heating device is attached, in a manner of generating heat.

On the other hand, the graphene heating device according to present invention may further include additional components that can maximize the effect of removing water droplets on a surface.

First, the adhesive layer of the graphene heating device according to the present invention may include a moisture absorbent 121 configured to absorb moisture.

Figure 3:
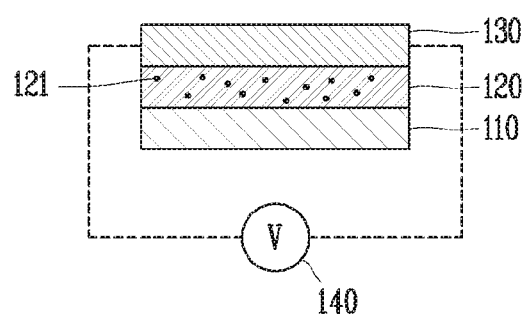
FIG. 3 is a sectional view of a graphene heating device including a moisture absorbent.

FIG. 3 is a sectional view of a graphene heating device including a moisture absorbent.

Here, the moisture absorbent is a material having high light transmittance. For example, the moisture absorbent may be made of at least one of calcium oxide, magnesium oxide, strontium oxide, aluminum oxide, barium oxide, calcium chloride, potassium carbonate, potassium hydroxide, sodium hydroxide, lithium hydroxide, lithium sulfate, sodium sulfate, calcium sulfate, magnesium sulfate, cobalt sulfate, gallium sulfate, titanium sulfate, nickel sulfate, and phosphorus pentoxide.

The adhesive layer 120 including the moisture absorbent 121 lowers ambient humidity so as to prevent by a predetermined level the formation of water droplets on a surface of the graphene heating device 100 or a surface of an object to which the graphene heating device 100 is attached. On the other hand, when it is impossible to prevent the formation of water droplets on a surface of an object only by the moisture absorbent, the graphene layer 130 may be controlled to generate heat so as to remove the water droplets formed on the surface of the object.

Unlike FIG. 3, the moisture absorbent may construct a separate layer. More specifically, the moisture absorbent may be disposed as a separate layer on at least one of a position between the transparent substrate 110 and the adhesive layer 120, a position between the adhesive layer 120 and the graphene layer 130, and an upper surface of the graphene layer 130. When the moisture absorbent is disposed on the upper surface of the graphene layer 130, a separate protective layer for protecting the moisture absorbent may further be provided. The protective layer covering the moisture absorbent layer may be formed to protect the moisture absorbent layer from mechanical friction and allow moisture to pass therethrough so that the moisture can be absorbed by the absorbent layer.

Meanwhile, the graphene heating device 100 according to the present invention may further include a coating layer that is configured to remove moisture on a surface.

Figure 4:
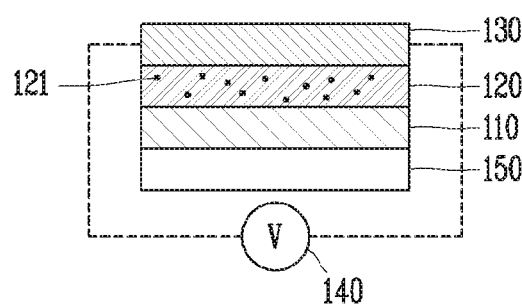
FIG. 4 is a sectional view of a graphene heating device having a hydrophilic or hydrophobic coating layer.

FIG. 4 is a sectional view of a graphene heating device having a hydrophilic or hydrophobic coating layer.

A hydrophilic or hydrophobic coating layer 150 may be formed on at least one surface of the graphene heating device according to the present invention.

The hydrophilic coating layer spreads water droplets on a surface thereof. As a result, small water droplets become clustered together, and the water droplets that become larger flow downward by their own weights. As a result, the water droplets on the surface are removed.

On the other hand, the hydrophobic coating layer prevents spreading or running of water droplets on a surface. As a result, the water droplets easily fall off from the surface.

Meanwhile, the hydrophilic coating layer may be made of TiO2, and may contain at least one of an ester compound, a silicone compound, a polyoxyethylene compound, and a fatty acid. In addition, the hydrophobic coating layer may be formed of any one of urethane silicone and fluorine compound. However, the present invention is not limited thereto.

On the other hand, since the hydrophilic coating layer and the hydrophobic coating layer are in direct contact with water droplets, they must always be disposed on the outermost surface of the graphene heating device 100. Also, for the above-mentioned reason, the hydrophilic coating layer and the hydrophobic coating layer need not have a multi-layer structure. However, an adhesive material may be applied to one surface of the coating layer to enhance adhesion between the coating layer and a layer in contact with the coating layer.

As described above, even if the graphene layer 130 does not generate heat, the graphene heating device 100 according to the present invention can remove water droplets formed on its surface by a predetermined level. Accordingly, the graphene layer 130 does not have to generate heat at all times to remove water droplets on the surface.

Hereinafter, the graphene layer 130 that selectively generates heat only in a specific situation will be described.

The power supply unit 140 may be configured to apply a voltage to the graphene layer 130 only when a predetermined condition is satisfied.

For example, the power supply unit 140 may be configured to supply a voltage to the graphene layer only when humidity around the graphene heating device 100 according to the present invention is higher than a reference humidity. To this end, the graphene heating device according to the present invention may further include a humidity sensor configured to sense humidity.

The humidity sensor senses ambient humidity of the graphene heating device 100. The power supply unit applies a voltage to the graphene layer when the ambient humidity is higher than the reference humidity based on a sensed value by the humidity sensor. Here, the reference humidity may be set to humidity at which water droplets can be formed on a surface of an object.

In another example, the power supply unit 140 may apply a voltage to the graphene layer according to a temperature of the surface of the graphene heating device or a surface of an object to which the graphene heating device is attached.

Specifically, the power supply unit 140 may be configured to supply a voltage to the graphene layer 130 when a surface temperature of an object is low enough to cause icing or freezing on the surface of the object. To this end, the graphene heating device according to the present invention may further include a temperature sensor configured to sense a temperature.

Here, the temperature sensor may be located on the surface of the graphene heating device or on the surface of the object to which the graphene heating device is coupled. When the temperature sensor is located on the surface of the object, the power supply unit applies a voltage to the graphene layer when icing occurs on the surface of the object.

Accordingly, the graphene heating device 100 according to the present invention can control the graphene layer 130 to selectively generate heat only in a specific situation, thereby preventing unnecessary power consumption.

Meanwhile, the graphene heating device according to the present invention can be used by being mounted in a vehicle lamp.

Specifically, when humidity is high, such as on a rainy day, a lamp cover of the vehicle lamp may become steamed up. In this case, transparency of the lamp cover is lowered due to water droplets formed on a surface of the lamp cover. As a result, brightness or luminous intensity of the lamp is lowered.

Particularly, in recent years, vehicle lamps including a plurality of semiconductor light emitting elements are being used. In the case of a vehicle lamp including a plurality of semiconductor light emitting elements, heat generated from the light emitting elements is discharged to the rear of the lamp, and thus it is difficult to expect that water droplets formed on a surface of the lamp are removed by the heat generated in the lamp itself.

To solve this problem, the graphene heating device according to the present invention may be used by being mounted on a vehicle lamp.

Figure 5:
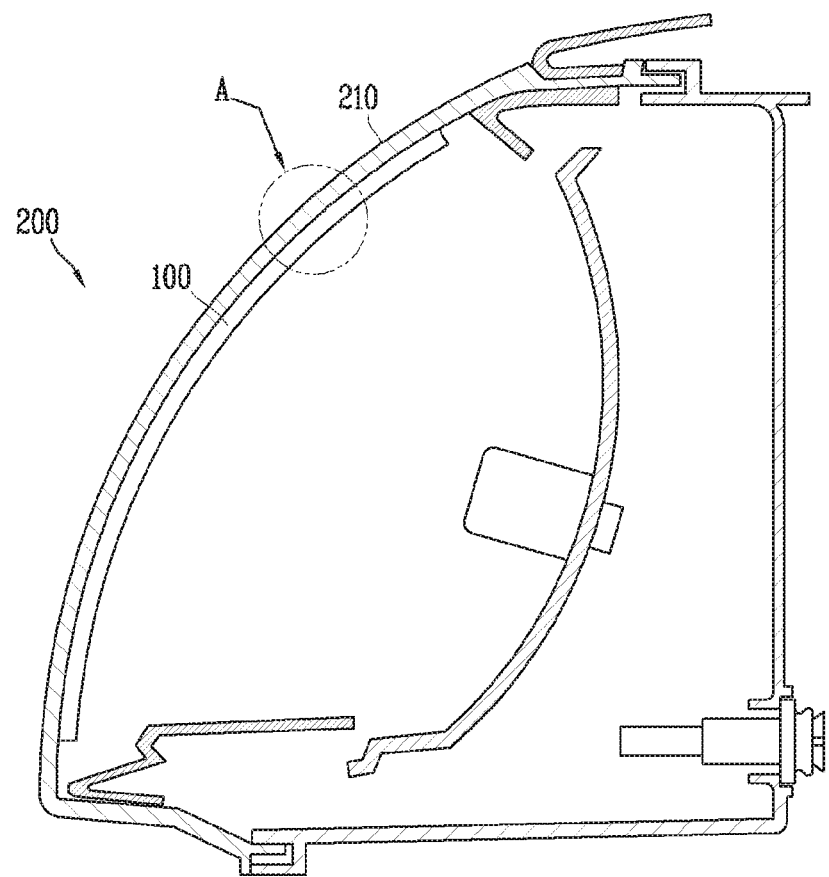
FIG. 5 is a sectional view of a vehicle lamp having a graphene heating device coupled thereto according to the present invention.
Figure 6:
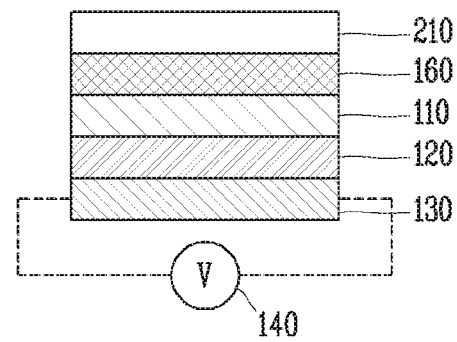
FIG. 6 is an enlarged view of an area A in FIG. 5.

FIG. 5 is a sectional view of a vehicle lamp having a graphene heating device coupled thereto according to the present invention, and FIG. 6 is an enlarged view of an area A in FIG. 5.

The graphene heating device 100 according to the present invention may remove water droplets formed on a surface of a lamp cover 210 of a vehicle lamp 200. To this end, the graphene heating device according to the present invention is coupled to the surface of the lamp cover 210.

In this specification, the surface of the lamp cover 210 refers to a surface located inside the vehicle lamp 200.

Referring to FIG. 5, the graphene heating device of the present invention may be disposed inside the vehicle lamp and may be brought into contact with the surface of the lamp cover 210. When the graphene heating device 100 is in contact with the surface of the lamp cover 210 located inside the lamp with the structure as illustrated in FIG. 5, moisture cannot penetrate between the surface of the lamp cover 210 and the graphene heating device 100. As a result, water droplets are not formed on the surface of the lamp cover 210, and formed on only one surface of the graphene heating device 100.

In detail, in the structure illustrated in FIG. 5, water droplets are formed on only one of an upper surface and a lower surface of the graphene heating device 100 that is not coupled with the lamp cover 210. Accordingly, in the structure illustrated in FIG. 5, the graphene heating device 100 is used for removing water droplets formed on one surface of the lamp cover 210.

At this time, the graphene layer 130 is preferably disposed at a side close to the surface where water droplets are formed. For example, as illustrated in FIG. 6, when the surface of the lamp cover 210 and the transparent substrate 110 are coupled to each other in a contact manner, water droplets are formed on one surface of the graphene layer 130.

Although not shown, the graphene heating device 100 may further include a protective layer covering the graphene layer 130. In this case, water droplets are formed on one surface of the protective layer.

Meanwhile, the protective layer covering the graphene layer may be the coating layer described in FIG. 4. Accordingly, the graphene heating device 100 according to the present invention can protect the graphene layer 130 and simultaneously remove part of water droplets formed on the surface of the graphene heating device 100 even without heating the graphene layer 130.

When the graphene heating device 100 is coupled to the surface of the lamp cover with the structure illustrated in FIG. 6, the graphene layer 130 can effectively transfer heat to water droplets formed on the surface thereof.

Meanwhile, the graphene heating device according to the present invention may further include an adhesive layer 160 disposed on one surface of the transparent substrate 110. The adhesive layer 160 disposed on the one surface of the transparent substrate 110 should be made of a material having high light transmittance.

The adhesive layer 160 disposed on the one surface of the transparent substrate 110 may be formed of a material having lower adhesion than the adhesive layer 120 disposed between the transparent substrate 110 and the graphene layer 130. Accordingly, the graphene heating device 100 according to the present invention can be detachably coupled to the surface of the lamp cover 210.

Meanwhile, the graphene heating device according to the present invention may be coupled to the surface of the lamp cover at a predetermined distance from the surface.

Figure 7:
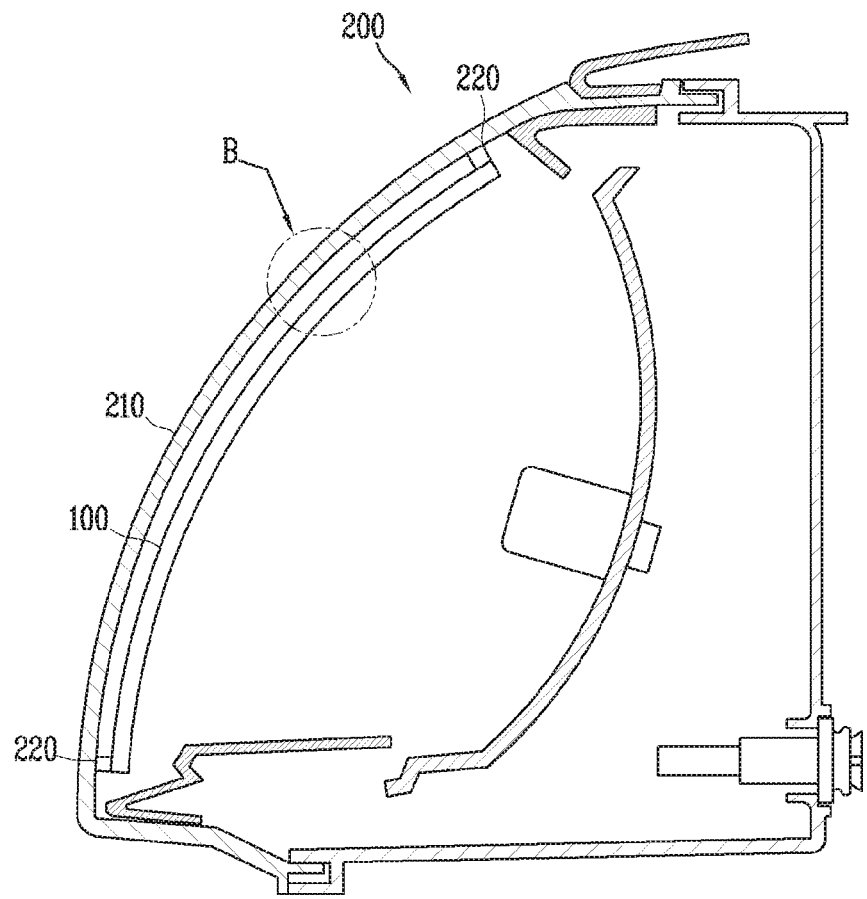
FIG. 7 is a sectional view of a vehicle lamp having a graphene heating device coupled thereto according to the present invention.
Figure 8:
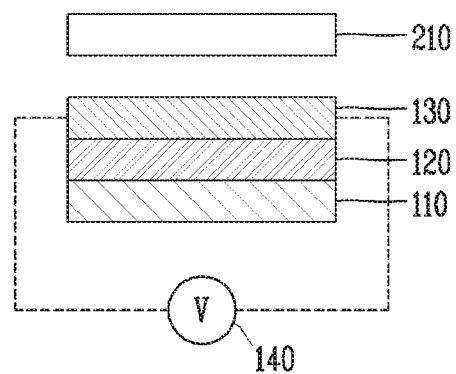
FIG. 8 is an enlarged view of an area B in FIG. 7.

FIG. 7 is a sectional view of a vehicle lamp having a graphene heating device coupled thereto according to the present invention, and FIG. 8 is an enlarged view of an area B in FIG. 7.

Referring to FIG. 7, the graphene heating device according to the present invention may be coupled to the surface of the lamp cover 210 at a predetermined distance from the surface. As a result, water droplets may be formed on the surface of the lamp cover 210.

Specifically, in the structure of FIG. 7, water droplets are formed on the surface of the lamp cover 210 and the surface of the graphene heating device 100. Accordingly, in the structure as illustrated in FIG. 7, the graphene heating device 100 is used to remove water droplets formed on a surface of an external object and the surface of the graphene heating device 100.

At this time, the graphene layer 130 is preferably disposed at a side close to the surface of the lamp cover 210 on which water droplets are formed. For example, as illustrated in FIG. 8, when the graphene heating device 100 is coupled to the lamp cover 210 at a predetermined distance, the graphene layer 130 may be disposed at a position adjacent to the surface of the lamp cover 210.

This allows the graphene layer 130 to effectively transfer heat to the surface of the lamp cover 210.

Meanwhile, the graphene heating device 100 according to the present invention may further include separate support portions 220 to allow the graphene heating device to be coupled to the lamp cover 210 at a predetermined distance. Referring to FIG. 7, the support portions 220 may be located at both end portions of the graphene heating device 100. In this case, the support portions 220 do not necessarily have to be made of a light-transmitting material.

On the other hand, an adhesive material may be coated on at least one surface of each of the support portions 220 so that the graphene heating device 100 can be coupled to the lamp cover. However, the present invention is not limited thereto, and the support portions 220 may allow the graphene heating device 100 to be coupled to the lamp cover through mechanical coupling with the vehicle lamp 220, not by using an adhesive material.

On the other hand, the graphene heating device according to the present invention may be coupled to only a part of the surface of the lamp cover.

Figure 9:
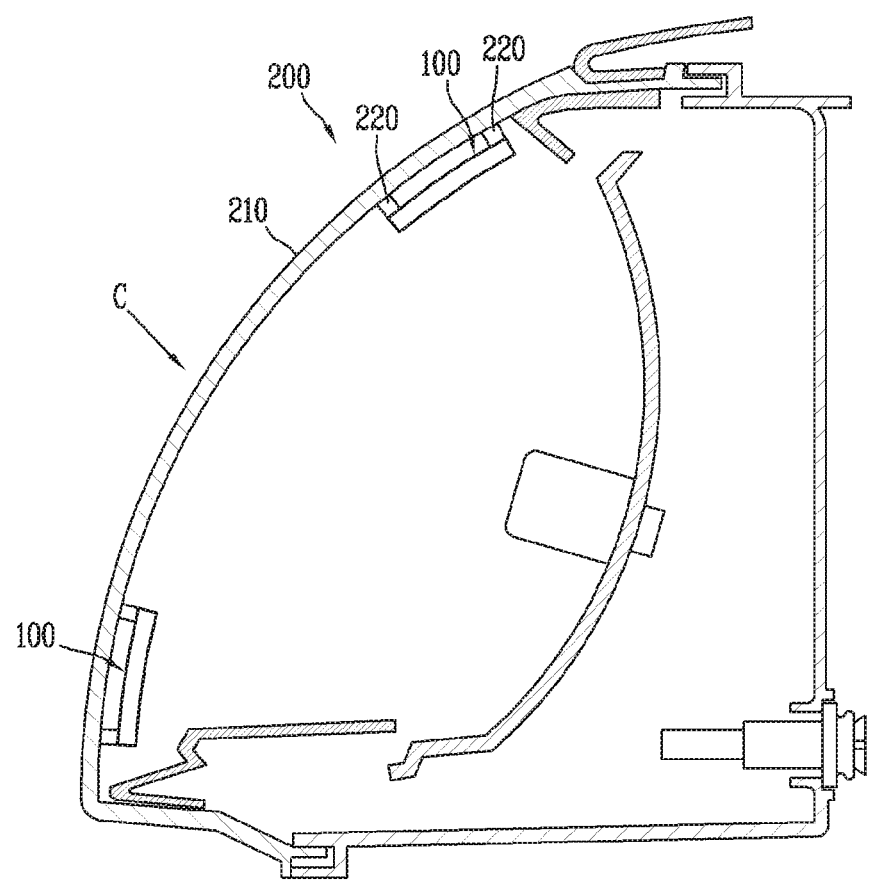
FIG. 9 is a sectional view of a vehicle lamp having a graphene heating device coupled thereto according to the present invention.
Figure 10:
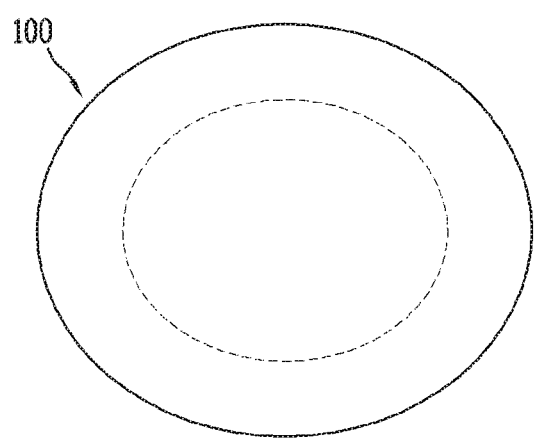
FIGS. 10 and 11 are conceptual views of the vehicle lamp illustrated in FIG. 9, viewed in a direction C.
Figure 11:
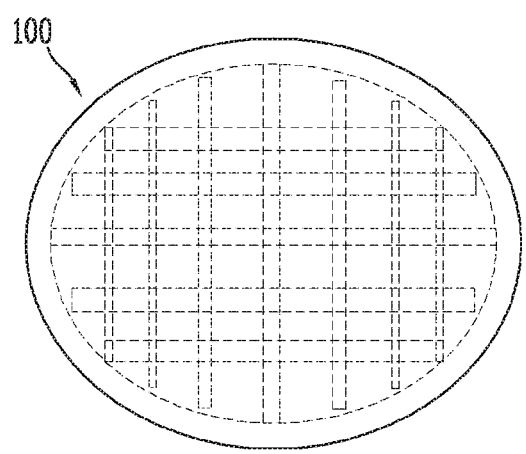

FIG. 9 is a sectional view of a vehicle lamp having a graphene heating device coupled thereto according to the present invention, and FIGS. 10 and 11 are conceptual views of the vehicle lamp illustrated in FIG. 9, viewed in a direction C.

Referring to FIG. 9, the graphene heating device 100 according to the present invention may be coupled to only a part of the surface of the lamp cover 210. For example, the graphene heating device 100 according to the present invention may be disposed at a position where an amount of light emitted from the lamp is relatively small. Specifically, when an amount of light emitted from a central portion of the vehicle lamp 200 is greater than an amount of light emitted from another portion, the graphene heating device 100 may be coupled only to the another portion except for the central portion of the vehicle lamp 200.

Referring to FIG. 10, the graphene heating device 100 according to the present invention may be disposed only on an edge of the lamp cover 210. Thus, the graphene heating device 100 can be prevented from absorbing light emitted from the central portion of the vehicle lamp.

In another embodiment, referring to FIG. 11, the graphene heating device 100 according to the present invention may be coupled to the lamp cover in the form of a mesh. Accordingly, a part of light emitted from the vehicle lamp is discharged to outside without passing through the graphene heating device 100. This may result in minimizing a reduction of brightness of the vehicle lamp due to the graphene heating device 100 of the present invention.

It will be apparent to those skilled in the art that the present invention may be embodied in other specific forms without departing from the spirit or essential characteristics thereof.

In addition, the above detailed description should not be construed as limiting in all aspects and should be considered illustrative. The scope of the present invention should be determined by rational interpretation of the appended claims, and all changes within the scope of equivalents of the present invention are included in the scope of the present invention.

The invention claimed is:

1. A graphene heating device, comprising:
a transparent substrate;
an adhesive layer formed on the transparent substrate; and
a graphene layer formed on the adhesive layer,
wherein:
the graphene layer is heated by a current flowing along the graphene layer when a predetermined voltage is applied; and
the adhesive layer includes a moisture absorbent for absorbing moisture.

2. The device of claim 1, further comprising a power supply unit to apply a voltage to the graphene layer.

3. The device of claim 1, further comprising:
a coating layer disposed beneath the transparent substrate and having hydrophilicity or hydrophobicity; and
a humidity sensor to sense humidity,
wherein the power supply unit applies a voltage to the graphene layer when the humidity sensed by the humidity sensor is equal to or higher than a reference humidity.

4. The device of claim 3, further comprising a temperature sensor to sense a temperature,
wherein the power supply unit applies a voltage to the graphene layer when the temperature sensed by the temperature sensor is equal to or lower than a reference temperature.

5. A graphene heating device, comprising:
a transparent substrate;
an adhesive layer formed on the transparent substrate; and
a graphene layer formed on the adhesive layer,
wherein:
the graphene layer is heated by a current flowing along the graphene layer when a predetermined voltage is applied; and
the graphene heating device is disposed inside a vehicle lamp.

6. The device of claim 5, wherein the graphene heating device is adhered on a surface of a lamp cover of the vehicle lamp.

7. The device of claim 6, further comprising an adhesive layer formed on a bottom surface of the transparent substrate,
wherein an adhesive layer formed on the bottom surface of the transparent substrate is adhered on the surface of the lamp cover.

8. The device of claim 5, wherein the graphene heating device is coupled to the lamp cover of the vehicle lamp at a predetermined distance therefrom.

9. The device of claim 8, wherein the graphene heating device is coupled to the surface of the lamp cover such that an upper surface of the graphene layer faces the surface of the lamp cover.

10. The device of claim 9, wherein the graphene heating device is detachably disposed on the surface of the lamp cover.

* * * * *